A. S. EMERSON.
DUST SEPARATOR.
APPLICATION FILED DEC. 30, 1907.
905,999.
Patented Dec. 8, 1908.
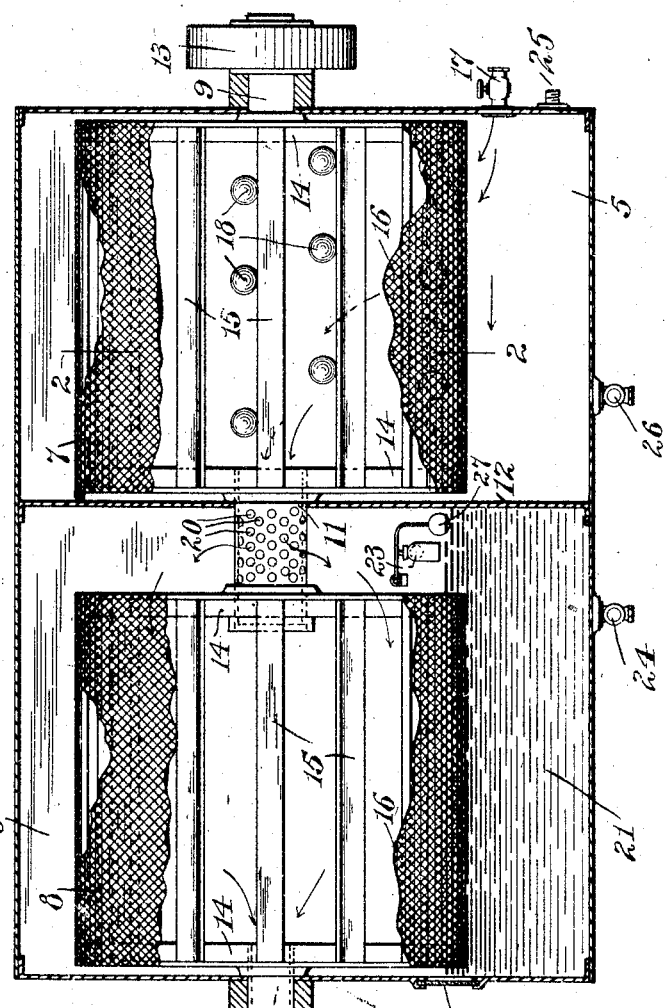
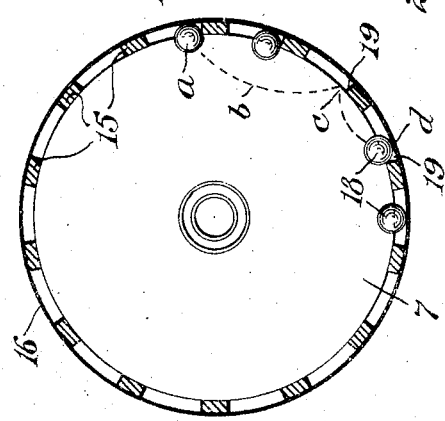
Witnesses:
Inventor:
Alfred S. Emerson
By his Attorney

UNITED STATES PATENT OFFICE.

ALFRED S. EMERSON, OF LONDON, ENGLAND.

DUST-SEPARATOR.

No. 905,999.

Specification of Letters Patent.

Patented Dec. 8, 1908.

Application filed December 30, 1907. Serial No. 408,521.

*To all whom it may concern:*

Be it known that I, ALFRED S. EMERSON, a citizen of the United States, residing in London, England, have invented certain new and useful Improvements in Dust-Separators, of which the following is a specification.

This invention relates to dust separators and has for its object to provide improved means for separating dust from air, and is particularly adapted for use in conjunction with pneumatic cleaning apparatus.

Considerable difficulty has been experienced in the use of dust separators by the overloading and consequent breaking of the separating sieve, generally a cloth. Another difficulty has been that as the cloth gradually accumulated a mass of dust which it separated from the air passing through it that the passage of the air would be impeded so that the apparatus would not always work with the same constancy of efficiency. The necessity of frequently opening the dust box and having to take the cloth and shake the dust out by hand made the use of the apparatus not only unpleasant to the operator but also unhealthful, and not only this but the instrumentality employed for removing dust by this means became a medium through which dust was disseminated in the vicinity in which the separator was installed. Another disadvantage of the apparatus wherein the sieve had to be removed for the purpose of the removal of the dust was that the cleaning operations had to be discontinued during the time the attendant was removing the dust from the sieve or separator cloth.

In the drawings accompanying and forming a part of this specification Figure 1 represents a practicable embodiment of a form of my invention; certain parts herein are shown in central vertical section, other parts are broken away, and other parts are shown in elevation; and Fig. 2 is a cross section of the primary separating device and is taken on a plane in about the line 2—2 of Fig. 1.

In the form of the device illustrated a casing is shown embodying two compartments 5 and 6, and within these compartments respectively there is a cylindrical rotary dust separator, designated by the reference characters 7 and 8 respectively. These separating cylinders are mounted on journals 9 and 10 supported by the walls of the casing and by a journal 11 supported by the partition 12 which divides the two chambers or compartments 5 and 6. A pulley 13 is fast to the journal 9 for the purpose of rotating both of the cylinders. In the present instance the cylinders are substantially the same in construction having solid heads 14 connected by longitudinally disposed ribs 15. These ribs are widely spaced apart and between each two adjacent ribs a sieve 16 is provided. In the present illustration this is a fabric of proper weave placed over the outside of the ribs, which fabric will in some instances be wire cloth having proper mesh to interrupt the passage of the dust with the air.

The dust laden air enters the chamber 5 from the cleaner head by means of a suitable hose connected at the connection 17. This will bring such dust laden air outside of the cylinder 7 and the air will pass through the fabric or sieve 16 to the inside of such cylinder. The major portion of the entrained dust being deposited on the outside of the sieve. Within the cylinder are weights for jarring the dust off of the sieve, in the present instance, there is shown a number of balls, designated without preference by 18, which are loose within the cylinder 7, and as this revolves will rest in the pockets 19 formed by the upwardly moving edge of the ribs 15 and the fabric, and as the cylinder continues to rotate the balls will drop and strike the fabric and thus knock off the dust as fast as it accumulates upon the outside of the same, thus not only keeping the separating medium free from dust so that it will always present an unobstructed surface, but it will remove certain particles of dust which lodge upon this fabric, and which if permitted to remain would, by continuation of the pressure of the air passing through be carried along with the air, but by being removed shortly after lodging upon the outer surface of the cylinder, this danger of the air again taking up the deposited particles of dust and carrying it forward is largely obviated.

In Fig. 2 it will be seen that the ball $a$ is just about ready to drop and it may be assumed that it will follow the line $b$ and drop into the pocket 19 at $c$ and the ball may then bounce from the point $c$ and fall into the pocket 19 at point $d$, thus one ball in dropping will no doubt strike the sieve at more than one place and produce a shaking of the fabric and efficiently remove the dust. This of course is a mere suggestion as to the way the balls will act, many things may modify the action in each specific instance.

The air having had much of the dust removed from it before it gets to the inside of the hollow cylinder 7 will pass from said cylinder through the journal 11, which is hollow, and is perforated, the perforations being designated without preference by 20. The air passes out of such perforations and enters the chamber 6 and will pass through the fabric 16 upon the cylinder 8 and pass through such fabric into the inside of such cylinder and pass out by the journal 10, which is hollow. The journal 10 will of course be connected with the pumping or other suction apparatus. For the purpose of removing the dust from the outside of the cylinder 8, and for keeping the fabric moist to assist it in its dust removing function, a body of water, designated in a general way by 21, is provided in the lower part of the chamber 6. A suitable sight 22 is shown for the purpose of permitting the attendant to see that the water is just sufficiently high to engage the lower portion of the cylinder. A supply of water may be admitted from time to time as occasion may demand through the water inlet 23, controlled by the float 27, and the muddy water may be permitted to escape through the cock 24, which will, in many instances, be connected to the sewer. The chamber 5 may also have a water connection 25 and a sewer connection 26 so that when it is desired to remove the dust which has collected within the chamber 5 water may be admitted and the sewer connection opened and the dust thus flushed out without the necessity of opening the chamber or permitting any of the contents thereof to escape in the form of dust.

Having described my invention I claim:

1. In a dust separator, the combination with a rotary cylinder embodying a series of widely spaced apart longitudinal ribs extending inwardly into said cylinder for carrying weights free within said cylinder upwardly as the cylinder rotates and permitting the weights to fall upon being so carried up, sieves extending between adjacent ribs, free weights within said cylinder and constructed and adapted for being carried up by said ribs and falling from the same and upon the sieves, and means for drawing air into said cylinder through the sieves.

2. In a dust separator, the combination with a pair of contiguous chambers, of a rotary body within each of said chambers, each of said bodies comprising a framework and a dust separating fabric carried thereby, means of communication between the inside of one of said rotary bodies and the adjacent chamber and with the outside of the rotary body therein, an inlet for dust laden air communicating to the outside of the first of said rotary bodies, and an outlet for connection with a suction device communicating with the inside of the other of said bodies, the latter of said chambers being adapted for containing a body of water having its normal surface level above a portion of said rotary body.

3. In a dust separator, the combination with a pair of chambers, a rotary body within each of said chambers and comprising fabric, and means for keeping this extended, means for conveying dust laden air to the outside of one of said bodies, means for conveying the air from the inside thereof to the outside of the other of said bodies, and means for exhausting the air from the inside of said latter body, means within one of said bodies for engaging the fabric thereon for jarring off the dust that accumulates, and means for engaging the outer side of the fabric upon the other of said bodies for removing the dust which accumulates thereon.

4. In a dust separator, the combination with a rotary body embodying a series of longitudinal inwardly extending ribs for carrying free balls within the cylinder upwardly as the body rotates and for permitting the balls to fall from the ribs upon being carried up, fabric on the outside of and extending between adjacent ribs, said fabric being in such a position in relation to the ribs that the portion thereof which is between adjacent ribs which are passing through a position at the lower portion of the path of movement of said ribs and fabric during the rotation of the body will be struck by balls falling from ribs ascending from the lower position, balls free within said body, and means for drawing air into said body through the fabric.

Signed at Nos. 9-15 Murray street, New York, N. Y. this fourteenth day of December, 1907.

ALFRED S. EMERSON.

Witnesses:
CHAS. LYON RUSSELL,
HENRY E. GREENWOOD.